Figure 3:
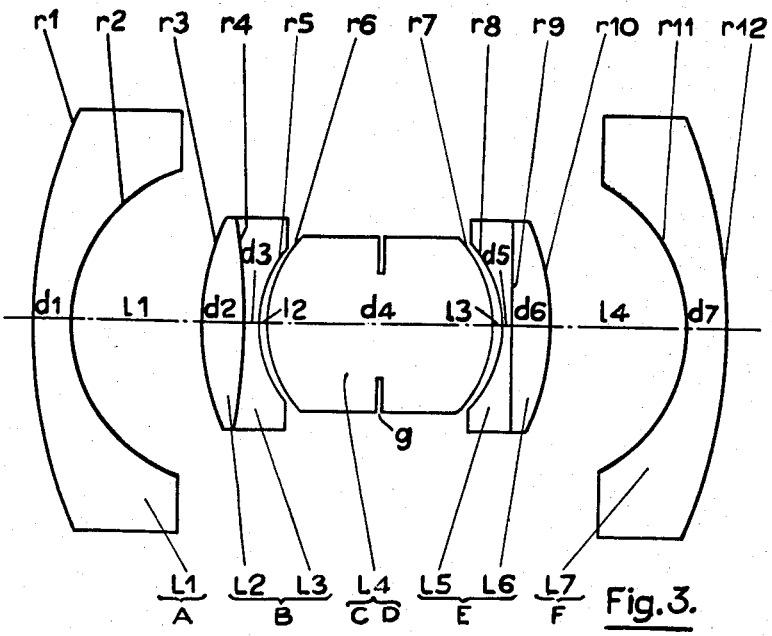

Feb. 14, 1956     L. J. BERTELE     2,734,424
WIDE ANGLE OBJECTIVES OF SIX AIR SPACED COMPONENTS
Filed Dec. 7, 1953     5 Sheets-Sheet 1
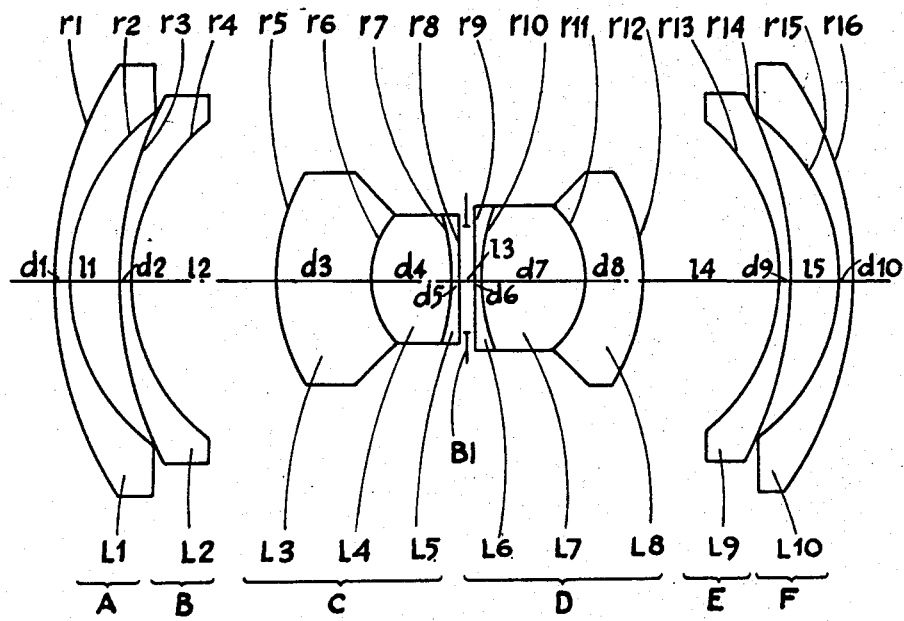
Fig. 1.
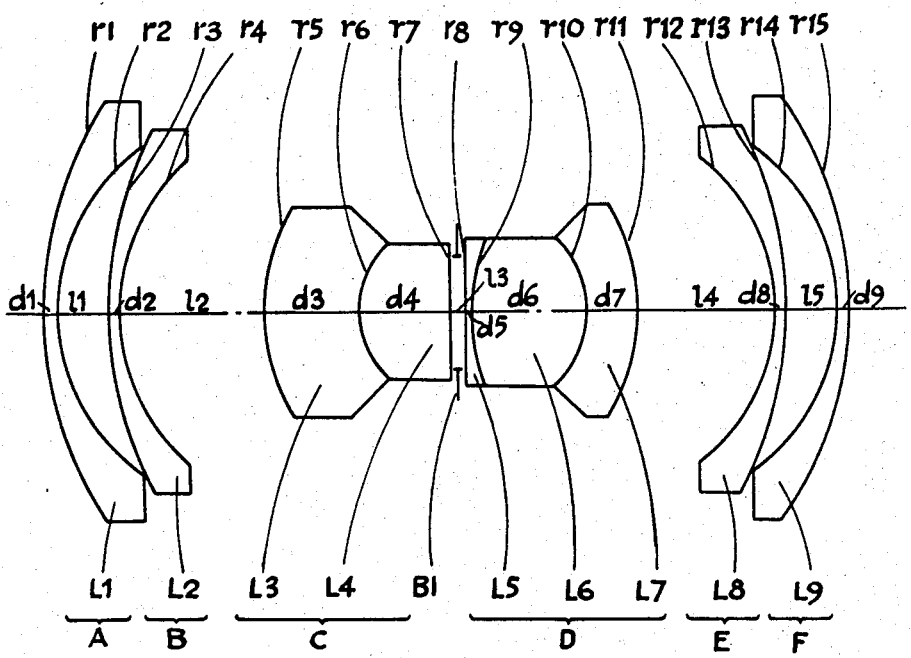
Fig. 2.    Inventor: Ludwig Jakob Bertele
By his atty's, Baldwin & Wight Inventor:
Ludwig Jakob Bertele
By his Attorneys
Baldwin & Wight Feb. 14, 1956           L. J. BERTELE           2,734,424
WIDE ANGLE OBJECTIVES OF SIX AIR SPACED COMPONENTS

United States Patent Office 2,734,424
Patented Feb. 14, 1956

2,734,424
WIDE ANGLE OBJECTIVES OF SIX AIR SPACED COMPONENTS

Ludwig Jakob Bertele, Heerbrugg, Switzerland

Application December 7, 1953, Serial No. 396,513

Claims priority, application Switzerland February 13, 1950

15 Claims. (Cl. 88—57)

This application is a continuation-in-part of my application Serial No. 209,359 filed February 5, 1951 (now abandoned).

The invention relates to optical objectives intended mainly but not exclusively for photography and projection. It is directed more particularly to a wide angle objective with an aperture in the neighbourhood of f/5.

In order to simplify the description and claims the focal plane at the greater distance from the corresponding principal focal plane will be termed the object and that at the smaller distance from the corresponding principal focal plane will be referred to as the image. Thus, when used for photography, the object will be the scene photographed and the image the sensitive surface of the plate or film. When used for projection the image will be the transparency or other article being projected and the object the screen on which the enlarged reproduction is exhibited.

A known form of wide angle objective is made up of four air-spaced components, of which the two inner ones have converging action and are provided with cemented surfaces, while the outer components are both meniscus-shaped diverging lenses strongly concave towards the inner components. In this objective the curvature of the inner or concave surface of the diverging lens facing towards the object is so great that this surface is utilised up to a central angle of about 180°, that is a hemisphere.

Investigations have shown that objectives of this known form no longer comply fully with the more recent requirements of surveying in regard to uniformity and quality of definition.

It is the object of the invention to provide an improved wide angle objective of large aperture by constructing it with six components in which at least the greater part of the positive power is concentrated in the two middle components, the outer components being diverging menisci concave towards the diaphragm position.

With this object in view the objective of the invention is made up of six components separated from each other by air spaces and located three on each side of the diaphragm position, the first and sixth components taken in consecutive order being of diverging power and of meniscus form concave towards the diaphragm position, the second and fifth components being of meniscus form concave towards the diaphragm position, the third and fourth components each being of converging power and having their extreme surfaces remote from the diaphragm position convex and separated from each other on the axis by a distance within the range 0.1 f to 1.6 f, where f is the focal length of the complete objective, and the air spaces between the first and second components and between the fifth and sixth components having each the shape of a converging lens.

It is preferable for the convex extreme surfaces of the third and fourth components to be separated from each other on the axis by a distance within the range 0.6 f to 1.4 f. In such cases the air space between the third and fourth components is better made not less than 0.03 f.

In the preferred form of construction the first, second, fifth and sixth components are single meniscus lenses, and when this is so, it is advantageous to have the sum of the refractive indices for the $d$-line of these four lenses not greater than 6.30. Also the third and fourth components are then conveniently composed each of at least two lenses cemented together. Such measures may be used to improve the correction of chromatic aberration, astigmatism, coma or distortion.

For the purpose of correcting the spherical aberration there may be included in each of the two inner converging components a cemented surface concave towards the diaphragm position and having its centre of curvature located between itself and the other of the said two surfaces, the refractive index of the glass on the convex side of the separation surface being higher than of that on the concave side. There is preferably in at least one of the inner converging components in addition a cemented surface having its convex side towards the diaphragm, the refractive index on the convex side of this cemented surface being smaller than that on the concave side.

Where cemented surfaces are mentioned above it is also within the scope of the invention to replace one or more of such surfaces by air layers of air spaces. In the latter case the curvatures of the glass surfaces bounding the air space may be made a little different. If an air space is so introduced into a converging component, it must be understood that from the point of view of the present description and the claims the group of lenses so divided is still regarded as a single component.

With a sequence of components as described above it is possible to achieve extensive removal of distortion. The shape of the spherical and chromatic aberration curves, as also of the astigmatism curves, is so straightened that only slight intermediate errors remain.

In some cases, particularly with objectives of large focal length, the construction referred to may lead to somewhat bulky objectives. Where this is the case it is better to keep to the lower part of the range of axial lengths over the extreme surfaces of the third and fourth components.

Thereby the shape of the sagittal branch of the astigmatism curve may be improved, so that this branch even at wide angles remains in the plane of best mean definition with an image radius in the optical axis corresponding with the Petzval formula of $+7$ f to $-7$ f. To achieve a similar result for the meridional branch, it is advisable to keep the axial separation between the third and fourth components less than 0.10 f.

By making the air spaces on the axis between the second and third components and between the fourth and fifth components smaller than those between the first and second components and between the fifth and sixth components, the second and fifth components can be made to contribute more towards the correction of spherical aberration, whereby the axial length over the extreme surfaces of the third and fourth components may be kept small.

The invention is illustrated by nine examples shown in Figures 1 through 9 of the accompanying drawings in conventional form.

In each figure the six components reckoned from the object side are designated by the references A, B, C, D, E and F. L with a number is used to denote the individual lenses, $d$ the axial thicknesses, $l$ the axial separations, and $r$ the radii of curvature of the boundary surfaces, the numbering being consecutive from the object side, while B1 denotes the diaphragm position.

Referring first to Figure 1, component A and component B are simple diverging meniscus lenses, $L_1$ and $L_2$ respectively, convex towards the object. Component C is made up of three lenses, namely a thick diverging lens $L_3$ of high refractive index and medium dispersion, a converging lens $L_4$ of medium refractive index, and a diverging lens $L_5$ of lower refractive index. Component D is substantially a mirror image of component C except in regard to precise dimensions and optical properties, being made up of the lenses $L_6$, $L_7$ and $L_8$. Components E and F are two simple diverging meniscus lenses $L_9$ and $L_{10}$ convex towards the image. The distance between the outer faces $r_5$ and $r_{12}$ of the converging components C and D facing the diverging components B and E is 0.967 f and the air space between the two converging components C and D is 0.0385 f. The sum of the refractive indices for the $d$-line of the four diverging components A, B, E and F is 6.034.

Figure 2 shows another example in which component A and component B are again simple diverging meniscus lenses $L_1$ and $L_2$ convex towards the object. Component C is here made up of only two lenses, namely a thick diverging lens $L_3$ of high refractive index and medium dispersion and a converging lens $L_4$ of lower refractive index. The two lenses $L_3$ and $L_4$ have a common cemented surface of which the concave side is towards the diaphragm. Component D is composed of three lenses, namely a diverging lens $L_5$ of low refractive index, a converging lens $L_6$ of medium refractive index, and a diverging lens $L_7$ having the highest refractive index of the component. The cemented surface between the lenses $L_5$ and $L_6$ is convex towards the diaphragm, while the lens $L_7$ is cemented to the lens $L_6$ by a surface concave towards the diaphragm. Components E and F are again two simple diverging meniscus lenses convex towards the image.

The distance between the two convex outer surfaces $r_5$ and $r_{11}$ of the converging components C and D facing the diverging components $L_2$ and $L_5$ is 0.973 f, and the air space between the components C and D is 0.0389 f. The sum of the refractive indices for the $d$-line of the four diverging components A, B, E and F is 6.034.

An objective differing considerably from the first two is shown in Figure 3. There the second and fifth components B and E are doublets and are placed much nearer to the third and fourth components C and D than to the first and sixth A and F. The inner air spaces are both 0.0182 f, while the outer ones are 0.2885 f and 0.3108 f respectively. In this example the converging components C and D are of the same kind of glass and are at zero spacing from each other. For convenience they are therefore made as a single piece of glass with a deep annular groove $g$ to act as the diaphragm. The components B and E are constructed as doublets for better correcting chromatic aberration. The axial length over the convex outer faces of components C and D (less $L_4$) is 0.8128 f.

Figure 4:
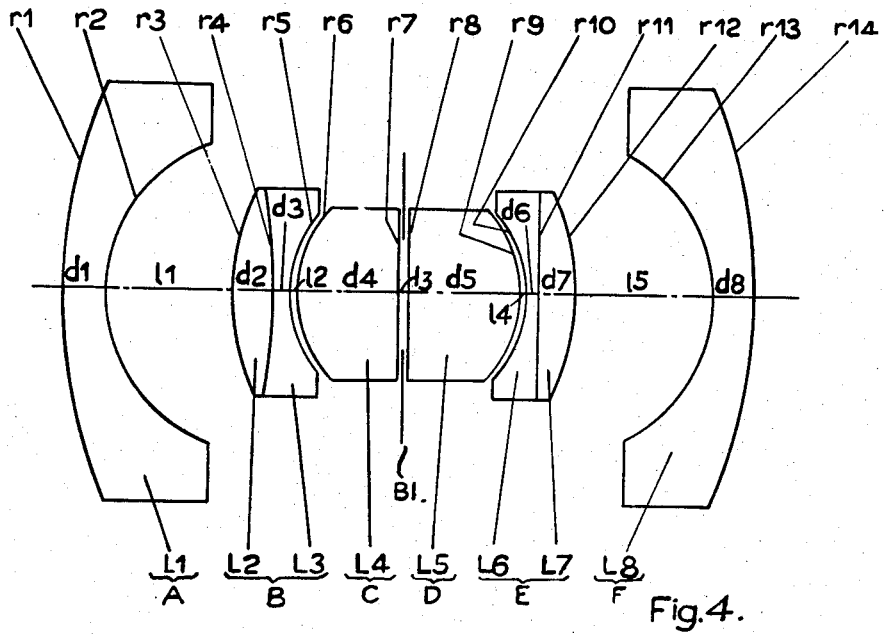

Figure 4 shows an objective having many points of resemblance with that of Figure 3. The axial air space between components B and C is 0.0182 f, which is much less than that between components A and B, viz 0.2887 f. Similarly the axial air space between components D and E at 0.0182 f is much less than the 0.3109 f separating components E and F. The axial length over the extreme surfaces of components C and D is here 0.798 f, while the axial length of the air space between these two components is 0.0172 f.

Figure 5:
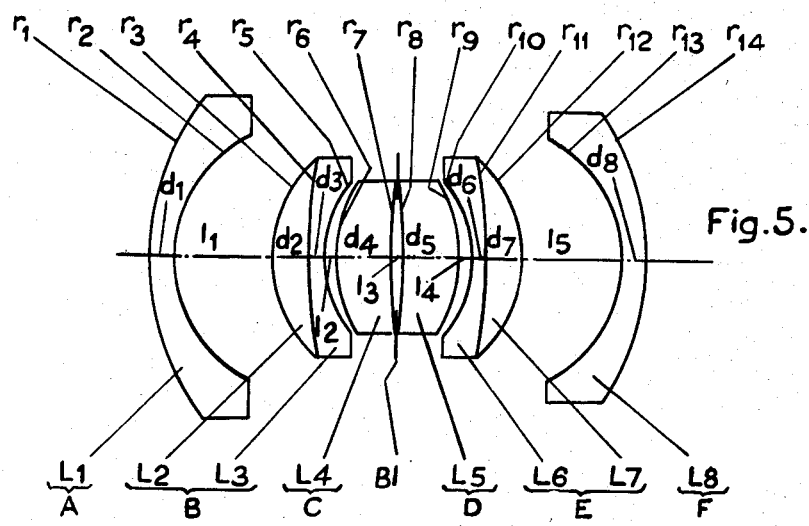

An objective is shown in Figure 5 having more resemblance with the last two than with the first two, but having the feature not exhibited by any other example in the present specification of slightly positive power in components B and E. These components are also made as doublets for the sake of better chromatic correction. The axial length over the outer convex faces of components C and D is 0.233 f.

Figure 6:
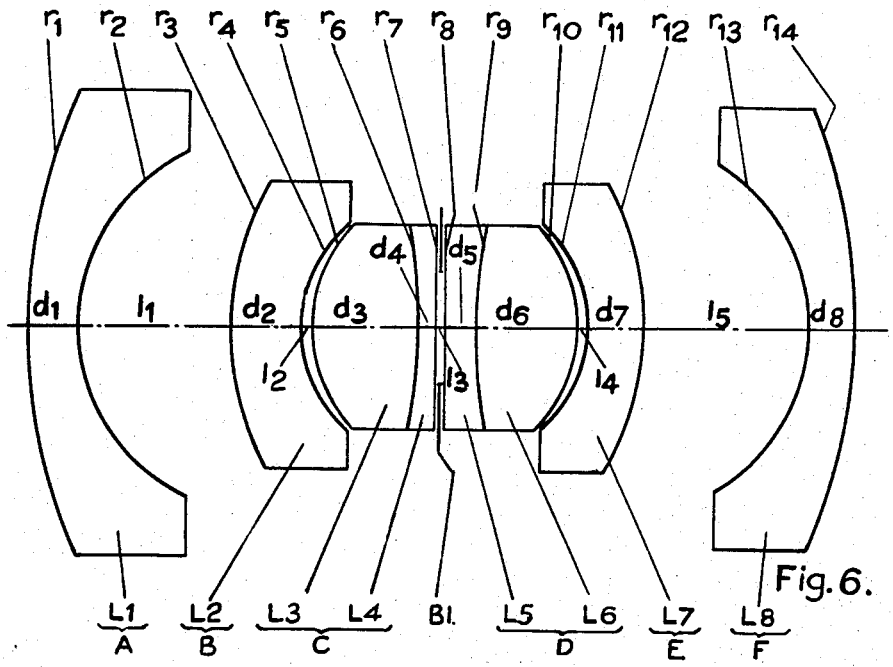

In Figure 6 the objective shown has single diverging meniscus lenses for the four components A, B, E and F, and the axial length over the outer convex faces of components C and D is 0.509 f.

Figure 7:
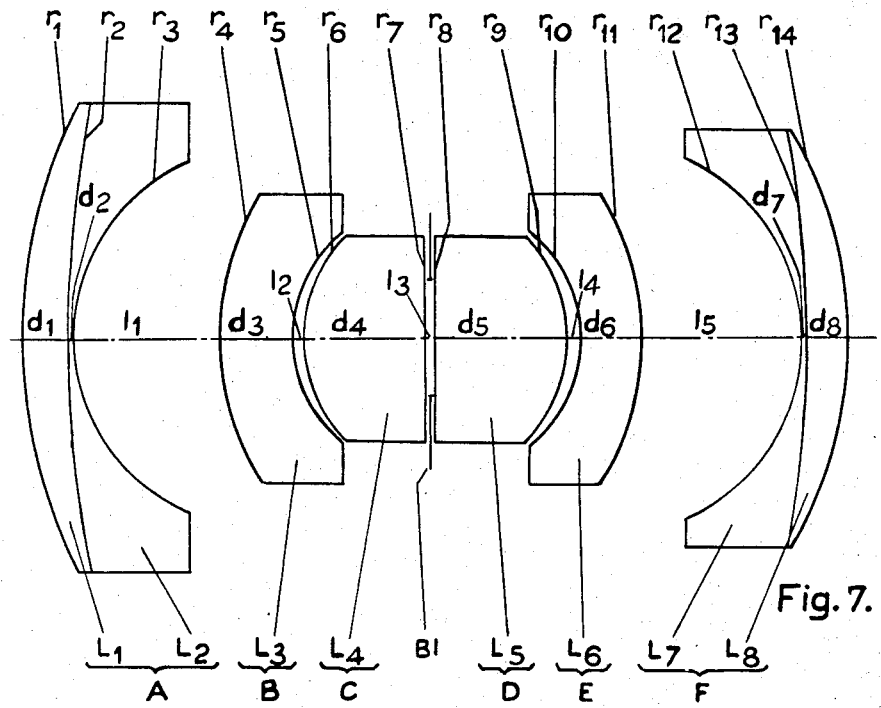

Figure 7 shows an objective in which the components A and F are constructed as doublets. The axial length over the outer convex faces of components C and D is 0.502 f.

Figure 8:
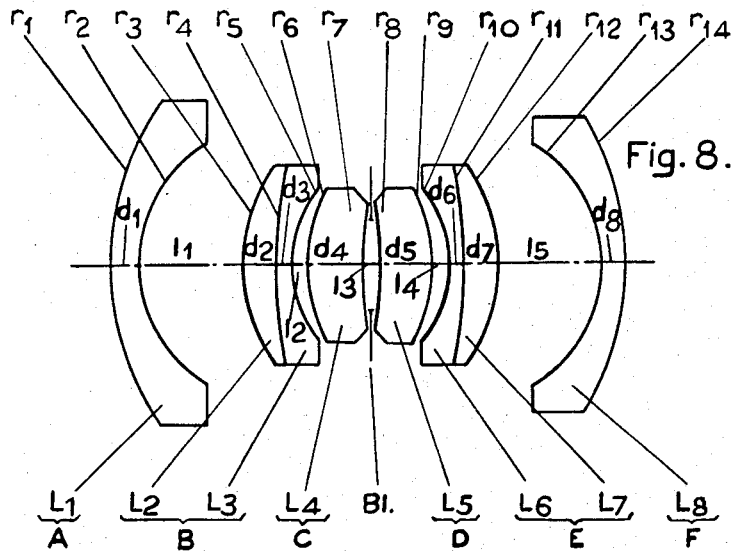

The objective shown in Figure 8 has components B and E formed as doublets and all the others as single lenses. The axial length over the outer convex faces of components C and D is 0.241 f.

Figure 9:
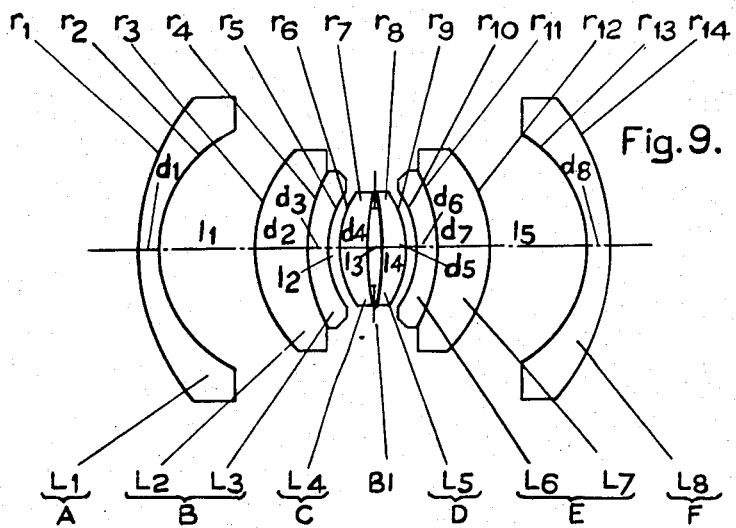

Figure 9 shows an objective similar to that of Figure 8, but here the axial length over the convex outer faces of components C and D is brought near to the lower limit specified and is 0.13 f.

The optical data of the various objectives are given in the following tables, in which the number of each example corresponds with the number of the figure illustrating it.

Example 1

[Focal length f=100 mm.   Relative aperture f/5]

| Lenses | Radii | Thicknesses and separations | Kinds of glass | |
|---|---|---|---|---|
| | | | Refractive index for d-line | Dispersion, Abbe number |
| $L_1$ | $r_1 = +100.06$ | $d_1 = 3.90$ | 1.5163 | 64.0 |
| | $r_2 = + 53.68$ | $l_1 = 13.28$ | | |
| $L_2$ | $r_3 = + 107.26$ | $d_2 = 2.88$ | 1.5163 | 64.0 |
| | $r_4 = + 53.44$ | $l_2 = 37.35$ | | |
| $L_3$ | $r_5 = + 56.55$ | $d_3 = 24.88$ | 1.7200 | 50.3 |
| $L_4$ | $r_6 = + 25.34$ | $d_4 = 21.18$ | 1.6138 | 58.6 |
| $L_5$ | $r_7 = - 73.16$ | $d_5 = 1.93$ | 1.5163 | 52.2 |
| | $r_8 = +1094.9$ | $l_3 = 3.85$ | | |
| $L_6$ | $r_9 = - 626.3$ | $d_6 = 1.93$ | 1.5163 | 52.2 |
| $L_7$ | $r_{10} = + 57.76$ | $d_7 = 27.34$ | 1.6138 | 50.8 |
| $L_8$ | $r_{11} = - 25.85$ | $d_8 = 15.56$ | 1.7200 | 29.3 |
| | $r_{12} = - 56.30$ | $l_4 = 36.20$ | | |
| $L_9$ | $r_{13} = - 50.25$ | $d_9 = 2.88$ | 1.5001 | 61.6 |
| | $r_{14} = - 98.96$ | $l_5 = 13.28$ | | |
| $L_{10}$ | $r_{15} = - 51.60$ | $d_{10} = 3.08$ | 1.5001 | 61.6 |
| | $r_{16} = - 94.24$ | | | |

Example 2

[Focal length f=100 mm.   Relative aperture f/5]

| Lenses | Radii | Thicknesses and separations | Kinds of glass | |
|---|---|---|---|---|
| | | | Refractive index for d-line | Dispersion, Abbe number |
| $L_1$ | $r_1 = +101.07$ | $d_1 = 3.94$ | 1.5163 | 64.0 |
| | $r_2 = + 54.22$ | $l_1 = 13.41$ | | |
| $L_2$ | $r_3 = +108.35$ | $d_2 = 2.91$ | 1.5163 | 64.0 |
| | $r_4 = + 53.98$ | $l_2 = 37.73$ | | |
| $L_3$ | $r_5 = + 57.12$ | $d_3 = 25.13$ | 1.7200 | 50.3 |
| $L_4$ | $r_6 = + 25.59$ | $d_4 = 23.57$ | 1.6138 | 58.6 |
| | $r_7 = -711.5$ | $l_3 = 3.89$ | | |
| $L_5$ | $r_8 = -632.6$ | $d_5 = 1.95$ | 1.5163 | 52.2 |
| $L_6$ | $r_9 = + 58.34$ | $d_6 = 30.34$ | 1.6138 | 50.8 |
| $L_7$ | $r_{10} = - 26.97$ | $d_7 = 12.45$ | 1.7200 | 29.3 |
| | $r_{11} = - 57.23$ | $l_4 = 36.56$ | | |
| $L_8$ | $r_{12} = - 50.76$ | $d_8 = 2.91$ | 1.5001 | 61.6 |
| | $r_{13} = - 99.96$ | $l_5 = 13.41$ | | |
| $L_9$ | $r_{14} = - 51.65$ | $d_9 = 3.11$ | 1.5001 | 61.6 |
| | $r_{15} = - 92.07$ | | | |

Example 3

[Focal length $f=100$ mm. Relative aperture $f/5$]

| Lenses | Radii | Thicknesses and separations | Kinds of glass | |
|---|---|---|---|---|
| | | | Refractive index for d-line | Dispersion, Abbe number |
| $L_1$ | $r_1 = +110.34$ | $d_1=10.12$ | 1.4870 | 70.0 |
| | $r_2 = +37.18$ | $l_1=28.85$ | | |
| | $r_3 = +58.34$ | | | |
| $L_2$ | | $d_2=10.12$ | 1.5400 | 59.6 |
| | $r_4 = -126.94$ | | | |
| $L_3$ | | $d_3=3.54$ | 1.5400 | 50.9 |
| | $r_5 = +26.18$ | | | |
| | | $l_2=1.82$ | | |
| | $r_6 = +28.82$ | | | |
| $L_4$ | | $d_4=52.34$ | 1.6176 | 60.3 |
| | $r_7 = -28.90$ | | | |
| | | $l_3=1.82$ | | |
| | $r_8 = -25.56$ | | | |
| $L_5$ | | $d_5=2.53$ | 1.5750 | 41.3 |
| | $r_9 = \infty$ | | | |
| $L_6$ | | $d_6=9.11$ | 1.5750 | 57.5 |
| | $r_{10}= -54.60$ | | | |
| | | $l_4=31.08$ | | |
| | $r_{11}= -36.83$ | | | |
| $L_7$ | | $d_7=9.21$ | 1.5015 | 56.5 |
| | $r_{12}= -113.67$ | | | |

Example 5

[Focal length $f=100$ mm. Relative aperture $f/4.5$]

| Lenses | Radii | Thicknesses and separations | Kinds of glass | |
|---|---|---|---|---|
| | | | Refractive index for d-line | Dispersion, Abbe number |
| $L_1$ | $r_1 = +48.86$ | $d_1=4.86$ | 1.5163 | 64.0 |
| | $r_2 = +25.45$ | $l_1=19.04$ | | |
| | $r_3 = +26.58$ | | | |
| $L_2$ | | $d_2=6.51$ | 1.6570 | 57.1 |
| | $r_4 = +106.85$ | | | |
| $L_3$ | | $d_3=2.91$ | 1.6055 | 49.2 |
| | $r_5 = +22.86$ | | | |
| | | $l_2=2.72$ | | |
| | $r_6 = +36.08$ | | | |
| $L_4$ | | $d_4=10.68$ | 1.5600 | 61.2 |
| | $r_7 = +211.95$ | | | |
| | | $l_3=1.94$ | | |
| | $r_8 = -211.95$ | | | |
| $L_5$ | | $d_5=10.68$ | 1.5600 | 61.2 |
| | $r_9 = -36.08$ | | | |
| | | $l_4=2.72$ | | |
| | $r_{10}= -22.86$ | | | |
| $L_6$ | | $d_6=2.91$ | 1.6055 | 38.0 |
| | $r_{11}=-106.85$ | | | |
| $L_7$ | | $d_7=6.51$ | 1.6570 | 57.1 |
| | $r_{12}= -26.58$ | | | |
| | | $l_5=19.04$ | | |
| | $r_{13}= -25.45$ | | | |
| $L_8$ | | $d_8=4.86$ | 1.5163 | 64.0 |
| | $r_{14}= -48.86$ | | | |

Example 4

[Focal length $f=100$ mm. Relative aperture $f/5$]

| Lenses | Radii | Thicknesses and separations | Kinds of glass | |
|---|---|---|---|---|
| | | | Refractive index for d-line | Dispersion, Abbe number |
| $L_1$ | $r_1 = +110.40$ | $d_1=10.13$ | 1.4870 | 70.0 |
| | $r_2 = +37.20$ | $l_1=28.87$ | | |
| | $r_3 = +58.37$ | | | |
| $L_2$ | | $d_2=10.13$ | 1.5400 | 59.6 |
| | $r_4 = -127.01$ | | | |
| $L_3$ | | $d_3=3.54$ | 1.5400 | 50.9 |
| | $r_5 = +26.19$ | | | |
| | | $l_2=1.82$ | | |
| | $r_6 = +28.84$ | | | |
| $L_4$ | | $d_4=23.40$ | 1.6176 | 60.3 |
| | $r_7 = \infty$ | | | |
| | | $l_3=1.72$ | | |
| | $r_8 = \infty$ | | | |
| $L_5$ | | $d_5=25.73$ | 1.6176 | 60.3 |
| | $r_9 = -23.92$ | | | |
| | | $l_4=1.82$ | | |
| | $r_{10}= -25.57$ | | | |
| $L_6$ | | $d_6=2.53$ | 1.5750 | 41.3 |
| | $r_{11}= \infty$ | | | |
| $L_7$ | | $d_7=9.12$ | 1.5750 | 57.5 |
| | $r_{12}= -54.63$ | | | |
| | | $l_5=31.09$ | | |
| | $r_{13}= -36.85$ | | | |
| $L_8$ | | $d_8=9.22$ | 1.5015 | 56.5 |
| | $r_{14}= -113.73$ | | | |

Example 6

[Focal length $f=100$ mm. Relative aperture $f/5.5$]

| Lenses | Radii | Thicknesses and separations | Kinds of glass | |
|---|---|---|---|---|
| | | | Refractive index for d-line | Dispersion, Abbe number |
| $L_1$ | $r_1 = +110.40$ | $d_1=10.13$ | 1.48697 | 70.0 |
| | $r_2 = +37.20$ | $l_1=28.87$ | | |
| | $r_3 = +58.37$ | | | |
| $L_2$ | | $d_2=13.67$ | 1.54000 | 59.6 |
| | $r_4 = +26.19$ | | | |
| | | $l_2=1.82$ | | |
| | $r_5 = +28.84$ | | | |
| $L_3$ | | $d_3=20.26$ | 1.61761 | 56.9 |
| | $r_6 = -91.15$ | | | |
| $L_4$ | | $d_4=3.14$ | 1.61761 | 36.4 |
| | $r_7 = \infty$ | | | |
| | | $l_3=1.72$ | | |
| | $r_8 = \infty$ | | | |
| $L_5$ | | $d_5=5.47$ | 1.61761 | 36.4 |
| | $r_9 = +78.90$ | | | |
| $L_6$ | | $d_6=20.26$ | 1.61761 | 60.3 |
| | $r_{10}= -28.92$ | | | |
| | | $l_4=1.82$ | | |
| | $r_{11}= -25.57$ | | | |
| $L_7$ | | $d_7=11.65$ | 1.57500 | 41.3 |
| | $r_{12}= -54.63$ | | | |
| | | $l_5=31.09$ | | |
| | $r_{13}= -36.85$ | | | |
| $L_8$ | | $d_8=9.22$ | 1.50149 | 56.5 |
| | $r_{14}= -113.73$ | | | |

Example 7

[Focal length f=100 mm.    Relative aperture f/5.5]

| Lenses | Radii | Thicknesses and separations | Kinds of glass | |
|---|---|---|---|---|
| | | | Refractive index for d-line | Dispersion, Abbe number |
| $L_1$ | $r_1 = +105.0$ | $d_1 = 9.0$ | 1.5020 | 56.5 |
| | $r_2 = +230.0$ | $l_1 = 1.0$ | 1.5020 | 66.7 |
| $L_2$ | $r_3 = +36.94$ | $l_1 = 28.0$ | | |
| | $r_4 = +57.49$ | $d_3 = 14.0$ | 1.5400 | 47.2 |
| $L_3$ | $r_5 = +25.86$ | $l_2 = 1.8$ | | |
| | $r_6 = +28.47$ | $d_4 = 23.1$ | 1.6176 | 60.3 |
| $L_4$ | $r_7 = \infty$ | $l_3 = 1.7$ | | |
| | $r_8 = \infty$ | $d_5 = 25.4$ | 1.6176 | 60.3 |
| $L_5$ | $r_9 = -28.55$ | $l_4 = 1.8$ | | |
| | $r_{10} = -25.25$ | $d_6 = 12.0$ | 1.5750 | 41.3 |
| $L_6$ | $r_{11} = -53.38$ | $l_5 = 30.2$ | | |
| | $r_{12} = -38.0$ | $d_7 = 1.1$ | 1.6433 | 47.8 |
| $L_7$ | $r_{13} = -230.0$ | $d_8 = 7.6$ | 1.5481 | 45.9 |
| $L_8$ | $r_{14} = -77.97$ | | | |

Example 8

[Focal length f=100 mm.    Relative aperture f/4.5]

| Lenses | Radii | Thicknesses and separations | Kinds of glass | |
|---|---|---|---|---|
| | | | Refractive index for d-line | Dispersion, Abbe number |
| $L_1$ | $r_1 = +53.05$ | $d_1 = 5.03$ | 1.5163 | 64.0 |
| | $r_2 = +26.45$ | $l_1 = 19.72$ | | |
| $L_2$ | $r_3 = +31.42$ | $d_2 = 6.74$ | 1.6570 | 57.1 |
| | $r_4 = +110.65$ | $d_3 = 3.01$ | 1.6055 | 49.2 |
| $L_3$ | $r_5 = +23.67$ | $l_2 = 2.82$ | | |
| | $r_6 = +28.74$ | $d_4 = 11.06$ | 1.5600 | 61.2 |
| $L_4$ | $r_7 = +155.13$ | $l_3 = 2.01$ | | |
| | $r_8 = -155.13$ | $d_5 = 11.06$ | 1.5600 | 61.2 |
| $L_5$ | $r_9 = -28.74$ | $l_4 = 2.82$ | | |
| | $r_{10} = -23.67$ | $d_6 = 3.01$ | 1.6055 | 38.0 |
| $L_6$ | $r_{11} = -110.65$ | $d_7 = 6.74$ | 1.6570 | 57.1 |
| $L_7$ | $r_{12} = -31.42$ | $l_5 = 19.72$ | | |
| | $r_{13} = -26.45$ | $d_8 = 5.03$ | 1.5163 | 64.0 |
| $L_8$ | $r_{14} = -53.05$ | | | |

Example 9

[Focal length f=100 mm.    Relative aperture f/5]

| Lenses | Radii | Thicknesses and separations | Kinds of glass | |
|---|---|---|---|---|
| | | | Refractive index for d-line | Dispersion, Abbe number |
| $L_1$ | $r_1 = +46.31$ | $d_1 = 4.84$ | 1.5163 | 64.0 |
| | $r_2 = +25.17$ | $l_1 = 18.41$ | | |
| | $r_3 = +26.75$ | | | |
| $L_2$ | $r_4 = +34.03$ | $d_2 = 9.69$ | 1.6034 | 60.7 |
| | | $d_3 = 3.88$ | 1.6034 | 38.0 |
| $L_3$ | $r_5 = +18.22$ | $l_2 = 1.94$ | | |
| | $r_6 = +21.32$ | $d_4 = 5.81$ | 1.5600 | 61.2 |
| $L_4$ | $r_7 = +96.89$ | $l_3 = 1.36$ | | |
| | $r_8 = -96.89$ | $d_5 = 5.81$ | 1.5600 | 61.2 |
| $L_5$ | $r_9 = -21.32$ | $l_4 = 1.94$ | | |
| | $r_{10} = -18.22$ | $d_6 = 3.88$ | 1.6034 | 38.0 |
| $L_6$ | $r_{11} = -34.03$ | $d_7 = 9.69$ | 1.6034 | 60.7 |
| $L_7$ | $r_{12} = -26.75$ | $l_5 = 18.41$ | | |
| | $r_{13} = -25.17$ | $d_8 = 4.84$ | 1,5163 | 64.0 |
| $L_8$ | $r_{14} = -46.31$ | | | |

I claim:

1. A wide angle objective made up of six components separated from each other by air spaces and located three on each side of the diaphragm position, the first and sixth components taken in consecutive order being of diverging power and of meniscus form concave towards the diaphragm position, the second and fifth components being of meniscus form concave towards the diaphragm position, the third and fourth components each being of converging power and having their extreme surfaces remote from the diaphragm position convex and separated from each other on the axis by a distance within the range 0.1 f to 1.6 f where f is the focal length of the complete objective, and the air spaces between the first and second components and between the fifth and sixth components having each the shape of a converging lens.

2. An objective as defined in claim 1, in which the first, second, fifth and sixth components are all of diverging power.

3. An objective as defined in claim 1, in which the first, second, fifth and sixth components are each simple lenses.

4. An objective as defined in claim 1, in which the first and sixth components are doublets.

5. An objective as defined in claim 1, in which the second and fifth components are doublets.

6. An objective as defined in claim 1, in which the air spaces measured on the axis between the second and third components and between the fourth and fifth components are substantially less than those between the first and second components and between the fifth and sixth components.

7. An objective as defined in claim 1, in which the air space measured on the axis between those surfaces of the third and fourth components which are adjacent to the diaphragm position is between 0.03 f and 0.10 f.

8. An objective as defined in claim 3, in which the third and fourth components are each composed of at least two individual lenses and the sum of the refractive indices for the d-line of the first, second, fifth and sixth components does not exceed 6.30.

9. An objective as defined in claim 3, in which the air spaces between the second and third components and between the fourth and fifth components both have the shape of a converging lens.

10. A wide angle objective made up of six components separated from each other by air spaces and located three on each side of the diaphragm position, the first and second components taken in consecutive order being single diverging meniscus lenses concave towards the diaphragm position and comprising between them an air space having the shape of a converging lens, the third and fourth components each being of converging power, comprising at least two lenses and having their extreme surfaces remote from the diaphragm convex and separated from each other on the axis by a distance within the range 0.6 f to 1.4 f, where f is the focal length of the complete objective, and the fifth and sixth components being single diverging meniscus lenses concave towards the diaphragm and comprising between them an air space having the shape of a converging lens.

11. An objective as defined in claim 10 in which the axial separation between the surfaces of the third and fourth components next to the diaphragm position is between 0.03 f and 0.10 f, and the sum of the refractive indices of the first, second, fifth and sixth components does not exceed 6.30.

12. An objective as defined in claim 10, in which at least one pair of adjacent surfaces of lenses in an inner converging component is cemented.

13. An objective as defined in claim 1 in which in at least one of the two inner converging components there is a separation surface concave towards the diaphragm position with the refractive index on the concave side less than on the convex side.

14. An objective as defined in claim 1, in which each of the two inner converging components has a separation surface between lens elements which is concave towards the diaphragm position and has its centre of curvature located between itself and the corresponding separation surface of the other inner component, the refractive index of the lens on the concave side of each of the said separation surfaces being lower than that of the lens on the convex side.

15. An objective as defined in claim 13, in which at least one of the two inner converging components has in addition a separation surface between lens elements convex towards the diaphragm position, the refractive index of the lens on the convex side of the said separation surface being lower than that of the lens on the concave side.

References Cited in the file of this patent

UNITED STATES PATENTS

| | | |
|---|---|---|
| 706,650 | Goerz | Aug. 12, 1902 |
| 2,031,792 | Richter | Feb. 25, 1936 |
| 2,325,275 | Rayton | July 27, 1943 |
| 2,383,115 | Durand | Aug. 21, 1945 |
| 2,516,724 | Roossinov | July 25, 1950 |

FOREIGN PATENTS

| | | |
|---|---|---|
| 600,005 | Great Britain | Mar. 30, 1948 |
| 680,185 | Great Britain | Oct. 1, 1952 |